Patented Nov. 23, 1948

2,454,533

UNITED STATES PATENT OFFICE 2,454,533

MANUFACTURE OF FIBROUS PRODUCTS DERIVING FROM LIGNOCELLULOSE

Henry E. Walter, Cloquet, Minn., assignor to Wood Conversion Company, Cloquet, Minn., a corporation of Delaware No Drawing. Application August 3, 1940, Serial No. 351,238

22 Claims. (Cl. 92—6)

The present invention relates generally to the production of fiber from lignocellulose, and in particular to the simultaneous subjection of the material to a mechanical defibering action in the presence of sulfur dioxide or a sulfite salt.

Reference is made to the U. S. Patents to Asplund No. 2,008,892, No. 2,145,851, and No. 2,047,170, relating respectively to a process and machine for producing fiber, and to the process using a fusible size. In general the machine provides a high pressure steam chamber housing a rotary grinding disk facing a stationary companion disk. Means is provided for introducing lignocellulose material, and particularly wood chips, into the chamber by forming an advancing plug. The material then is conveyed to the grinding disks where, softened by heat, it is readily defibered, for example in the case of Jack Pine at about 150 lbs. steam pressure at 365° F., or in the case of aspen at about 135 lbs. steam pressure. The formed fiber is discharged through a valved orifices, by the differential pressure of the steam chamber and the atmosphere. Raw wood, or wood with absorbed added water, is preferably employed, there being insufficient water to suspend the wood or fiber, and only sufficient to discharge a moist fiber.

Such fiber has many uses. One use is as bulk fiber. Among the uses is the ultimate formation of felts, such as paper, cardboard, insulation board, and hard board. These all may involve felting the fibers from water suspension in the several well known methods and machines. As in the case of chemically cooked fibers so formed into felts, the fiber desirably provide the "paper makers bond." This is obtained through a process of hydration. Upon the degree of hydration depends the felt formation, and strength of the ultimate product. Hydration involves mechanical work on wet or water-suspended fiber, at great expenditure of power. Difficultly hydratable fibers call for more expenditure of power and longer time. Length of time of hydration increases the breakage or reduction in size of the fibers. Such breakage lowers the strength.

The fibers resulting from the operation of the Asplund machine upon raw lignocellulose material are of course susceptible to the usual operations of hydration, felt-forming and drying to provide papers, boards and the like, but the production of such products presents difficult problems. To secure adequate hydration considerable power and time are required, accompanied by breakage of fiber. The resulting boards are relativley weak in physical properties, or outside the desirable strength to density ratio.

The present invention aims to preserve the desirable advantages of mechanically reducing lignocellulose to fiber in the Asplund machine or in like useful machines or processes, and to employ simultaneously a chemical effect upon the material whereby the resulting fibers are improved in their properties pertinent to making felted products.

The cooking of wood and other lignocellulose material has heretofore been accomplished with sulfur dioxide, acid sulfite salts and also with monosulfite salts in neutral or alkaline solution. Where sulfur dioxide or sulfites are present there is a reaction between lignocellulose and the sulfurous acid radical, producing what is termed a lignin sulfonic acid complex, the formation of which contributes to the separation of lignin and cellulose. It is common to cook wood chips with a sulfite liquor to soften the chips, then mechanically to defiber the softened chips. Such cooking takes place in pressure vessels over a period of a few hours.

It is an object of the present invention to reduce wood and other lignocellulose to fiber rapidly and economically, by subjecting the wood or the like to mechanical defibration at elevated temperatures in a gaseous environment and in the presence of a sulfurous acid radical, preferably as a sulfite to provide available alkali.

It is also an object of the invention to defiber wood mechanically with a substantially simultaneous chemical action, to improve the quality of the resulting fiber for making wet-formed felts, and to improve the physical properties of the felted products, and particularly of rigid board.

Various other and ancillary objects and advantages of the invention will be apparent from the following description and explanation of the invention.

The invention is more particularly illustrated herein by reference to the use of wood, since wood, compared to straw and grasses, imposes greater burdens in reducing it mechanically to fiber. Wood and other lignocellulose, is naturally acid and acid-forming. The fiber discharged from feeding wood or other lignocellulose, through the Asplund machine and process, has a pH considerably lower than 7, depending in part upon the species of wood. It, therefore, follows that in the Asplund process of defibering, the wood is subjected at high temperature to acid conditions, not by added acid, but by its own elements. Acid conditions and high temperature are not favorable to hydration, so that a normal hydration practiced on the resulting fiber is a difficult hydration.

According to one phase of the present invention the acid condition during defibration may be changed to neutral or toward neutral or to the alkaline side, by adding to the lignocellulose to be defibered, a quantity of a wood-cooking sulfite of an alkaline-earth metal or alkali metal (including magnesium), and more rarely ammonium. Such a sulfite salt provides upon reaction with the acidity in or from the lignocellulose, a basic element to neutralize the acidity and also provides sulfite radical to act with the lignin as an addition or modifying agent. The acidity of wood or the like is capable of releasing sulfur dioxide which is available for further reaction with the lignocellulose. Approximately 4% to 5% of sodium monosulfite based upon the weight of dry aspen wood is sufficient to provide a product in which the acidity is nearly neutralized. However, much more and much less than said 4% to 5% of sodium monosulfite based on the weight of dry wood may be used. Smaller amounts give less effect, and larger amounts give greater effect. For example, 10% by weight of sodium monosulfite based on weight of dry wood may be used, the cellulose content of wood being resistant to sodium monosulfite even at elevated temperatures, as in digesters for producing cellulose pulp. The monosulfite salt may thus neutralize acid, and release one equivalent of $SO_2$ for reaction with the lignin, or other constituent of the lignocellulose. Where it is desired to release more than one such equivalent, and up to two, then a bisulfite salt may be added. If still more is required, excess $SO_2$ may be present.

The sulfite salt may be added as a solid or as a solution, with the lignocellulose entering the machine, or as a separate introduction to the material already in the machine, but in advance of the last stage of the defibering. In using a solution, care should be taken that liquid introduced does not avoid the gaseous environment and suspend the material in liquid.

Where a bisulfite salt is used, there are two equivalents of sulfur dioxide per unit of alkali reserve, compared to but one equivalent when using monosulfite salt of the same metal. Alkali metal salts are preferred in order to avoid forming insoluble salts in the fiber and to permit washing the fiber free from the added chemical and the products solubilized in the defibering machine using the chemical.

The discharged partially or wholly neutralized or alkaline fiber, for some uses, may be then leached with water, whereby soluble material, including residual products of the sulfite salt, is extracted. The resulting washed fiber then customarily exhibits a characteristic acid pH of slightly below 7. Such fiber is then subjected to refining or hydration in a usual way, as in a Jordan, a beater, a Bauer, or other suitable equipment, which may at the same time both refine and hydrate, to break down any bundles of fiber to ultimate fibers. Such hydration is preferably carried out in water free from added agents, such as alkali, which are well known to change the rate and character of hydration. However, if desired, such added agents may be used. The refined and hydrated fiber is then ready for felting.

Preliminary to felting, some treatment of the fiber may be desired. It is common in making insulating board to add a wax emulsion to the stock, and to precipitate the wax with alum. If a paper is to be made, it may be desirable to size the stock by adding a rosin soap or the like, and precipitate with alum. These and other familiar treatments may be practiced. Fireproofing agents may be present in the stock.

In developing the invention, it has been found that there are several distinct effects resulting from the use of sulfite salt. Wood especially is defibrated more uniformly with less of the coarser sticks or slivers, while avoiding that increase in fines which would result in avoiding sticks without the chemical. The color of the stock is lightened to a creamy white, having the indication of a bleaching action. This is no doubt the result of action of the $SO_2$ on the substance, for it has been ascertained that where neutralization occurs by use of caustic soda in place of a sulfite salt, a darkening of the fiber results. The creamy white stock is also softer. The use of either caustic soda or sulfite salt increases the ease of gelatinization of the washed fiber, especially for paper-making. In gelatinizing comparable stocks, one made without treatment by chemical, one with caustic soda, and one with sodium sulfite, it is found that to attain a slowness value of 19 seconds, they require respectively 100, 75 and 115 minutes, whereas to attain a slowness of 300 seconds, they require respectively 255, 170, and 210 minutes. Breakage during gelatinization is also an important factor, and with a given stock, the breakage is greater the longer the time of gelatinization. It has been found that where it took slightly longer to gelatinize the sulfite-treated fiber, the breakage was less than where no treatment is used. Thus, in the case of the three fibers above referred to and gelatinized in 100, 75 and 115 minutes, an indicative measure of breakage shows a reduction in a coarseness index of 44%, 33% and 41% respectively.

The strength of felted products such as board, made in comparable processes respectively from untreated fiber and sulfite treated fiber, is considerably increased. The acidity of the fiber stock is considerably decreased.

From other development work, it is known that wood contains, develops or releases acid under the conditions of the steam environment in the Asplund machine, as it passes through the machine in 60 seconds more or less. It is thus logical to assume that the basic part of the sulfite salt is available to neutralize acid, and that the sulfite radical reacts with the lignocellulose substance, even in this short space of time.

The term "pH of the fiber" is in effect the pH of a water extract of the fiber determined as follows:

A sample of 10 grams of oven-dry fiber, or 10.7 grams of air-dry fiber, is extracted for ¾ hour at 50° to 60° C. in 100 cc. of distilled water which has been boiled. The water is separated, stoppered and cooled to room temperature, and its pH is measured.

"Friability" is a measure of the ease of the air-dry fiber to break as set forth in Anway U. S. Serial No. 290,999, filed August 19, 1939, now U. S. Patent No. 2,324,126, issued July 13, 1943. It involves a standardized pounding of the fiber, giving the rate of dust formation with pounding.

"Compressive properties" are those of dry bulk unfelted fiber as set forth in the copending application of Anway U. S. Serial No. 313,920, filed January 15, 1940, now U. S. Patent No. 2,325,026, issued July 27, 1943. Briefly, two columns of weighed fibers in cylinders of different diameters are compressed by a moving piston at a slow and standardized rate. The pressures exerted by the columns as a result of the compression are correlated to the density of the columns. From the data the properties are calculated.

"Free footage" is an extrapolated density value, expressed as a reciprocal density in "board-feet per pound of fiber" when the fiber is unfelted by pressure other than its own weight. It is akin to "fluffiness."

"Specific elasticity" ($K_E$) is an indication of the elastic properties when the fiber being compressed is at an arbitrary reciprocal density of 3.15 board feet per pound.

"Absolute elasticity" is an index, or an indicative slope of a line produced in the mathematical solution, on which line the value $K_E$ is read.

"Specific felting" ($K_F$) is an indication of the force which felts the fiber as it is being compressed and at 3.15 board feet per pound.

"Absolute felting" ($M_F$) is an index, or an indicative slope of a line produced in the mathematical solution, on which line the value $K_F$ is read.

"Coarseness modulus" or C. M. is an arbitrary but standardized measure of particle size distribution. The method and apparatus is set forth in Heritage U. S. Serial No. 336,495, filed May 22, 1940, now U. S. Patent No. 2,325,055, issued July 27, 1943. Briefly, a specimen is divided by screening, into fractions according to screen size, and the percents as fractions are weighted in totaling, to give a significant figure, larger as the general coarseness of the fiber increases. Numerous systems different in detail are used to classify fiber, but different systems give correlatable values for conversion from one to another.

In order to illustrate the nature of the invention, the following results are given, comparing properties, one on untreated aspen wood, one treated with caustic soda at 5% usage based on dry wood, and one on like wood treated with usages of 5.75% (based on dry wood) of sodium sulfite and 0.15% of mixed sodium carbonates calculated as $Na_2CO_3$.

COMPARATIVE ANALYSIS OF FIBERS

Aspen wood, defibered in the Asplund machine, both untreated and treated as above stated, is extracted at 2% consistency with boiling water for two hours. The following results obtain on the basis of 100 parts of dry fiber based upon aspen wood having 20.7 parts lignin, and 51 parts alpha cellulose.

| | Parts by Weight | | |
|---|---|---|---|
| | Untreated | $Na_2SO_3$ Treated | NaOH Treated |
| Fiber | 90.2 | 81.5 | 76.0 |
| Lignin in fiber | 16.9 | 15.1 | 14.4 |
| Solubles | 9.8 | 18.5 | 24.0 |
| Carbohydrates in solubles | 6.0 | 12.9 | 17.7 |
| Lignin in solubles | 3.8 | 5.6 | 6.3 |

Composition of fiber

| | Untreated | $Na_2SO_3$ Treated | NaOH Treated |
|---|---|---|---|
| | Per cent | Per cent | Per cent |
| Alpha Cellulose | 56.6 | 62.5 | 67.0 |
| Lignin | 18.7 | 18.5 | 19.0 |
| Carbohydrates not cellulose | 24.7 | 19.0 | 14.0 |

In the foregoing table, the untreated fiber composition is compared to that obtained by the present invention and that obtained by the invention of my copending application Serial No. 3,512,240, filed August 3, 1940, claiming the caustic soda. It is observed, however, that the compositions as given are those obtained by the effect of the treatment in the defibering machine and in the 2-hour extraction. The change in composition is attended with greater yield in case of the sodium sulfite treatment, over the caustic soda treatment. It is not indicated that the "lignin" and "carbohydrates" reported, are the same in identity in the several fibers.

EXAMPLE 1

Fiber is produced from peeled aspen by forcing it in chip form into an Asplund defibrator, operating at 135 lbs. steam pressure. In one case about 5% usage of sodium sulfite (as above given) is added, in another case 5% usage of NaOH is added, and in the other case no agent is added. The stocks are then washed similarly with cold water (60° F.) and refined at about 7.5% consistency with water (40 parts per 3 parts of fiber) in a ball mill under standard operating conditions, to attain a slowness of 19 seconds (Williams slowness and porosity tester), and the time of refining recorded. Before and after ball-milling, the particle size distribution is recorded as a "coarseness modulus." This is an index determined by weighting the fractions obtained by separating with standardized methods and screens. The higher the index, referred to as C. M., the coarser the fiber.

The results of defibering and refining are indicated as follows:

Sample S-266

| | Untreated 65 | $Na_2SO_3$ Treated 467 | NaOH Treated 466 |
|---|---|---|---|
| pH: | | | |
| Before washing | 5.3 | 6.15 | 7.18 |
| After washing | | 6.85 | 6.84 |
| After ball-milling | 5.5 | 5.90 | 6.72 |
| Minutes to attain freeness 19 seconds | 100 | 115 | 75 |
| Coarseness Modulus: | | | |
| Before Milling | 145 | 124 | 125 |
| After Milling | 81 | 73 | 84 |
| Per Cent Reduction in CM by milling | 44 | 41 | 33 |

MAKING BOARD

The above fibers after hydration, without other treatment, are formed into boards of the character referred to as insulation board. This comprises merely felting a slurry of the fibers on a wire in a suitable manner to provide roughly a board of ½-inch thickness. The wet mat thus formed is pressed to ⅜-inch thickness. It is then dried in several ways. One extreme is to dry the mat without restraint, whereby it may swell or springback, or shrink, in drying, if it will. Another way is to dry with restraint on the wet mat. This may be by means to maintain constant thickness, or means to maintain constant pressure. The latter is preferred for comparisons, and is used at 100 pounds per sq. ft., to obtain the "restraint" values given below.

Unrestrained drying

|  | Untreated | $Na_2SO_3$ Treated | NaOH Treated |
|---|---|---|---|
| Dried Specimen Weight, grams | 30.4 | 29.7 | 31.3 |
| Dried Specimen Thickness, inches | .600 | .544 | .533 |
| Pounds per cu. ft. (density) | 15.4 | 16.5 | 17.8 |
| Per cent increase over pressed wet thickness on: |  |  |  |
| Releasing pressure | 72.0 | 54.4 | 50.0 |
| On drying | 60.0 | 45.1 | 42.1 |

Restrained drying

|  | Untreated | $Na_2SO_3$ Treated | NaOH Treated |
|---|---|---|---|
| Density, lbs. per cu. ft. (Dried Board) | 17.23 | 16.95 | 22.79 |
| Per cent increase over pressed wet thickness on: Drying with 100 lbs./sq. ft. pressure | 34.7 | 17.3 | 9.9 |
| Property Values in Bending: |  |  |  |
| Board Thickness in inches | .492 | .417 | .383 |
| Load in lbs. at elastic limit | 14.7 | 12.0 | 21.0 |
| Load in lbs. at point of rupture | 20.0 | 18.0 | 31.6 |
| Modulus of Elasticity | 33,200 | 43,900 | 77,200 |
| Modulus of Rupture | 248 | 311 | 647 |
| Modulus of Transverse Strength | 182 | 207 | 429 |

It is thus seen that the board is not only strengthened by using the treated fiber, but the density is actually decreased in the case of the sulfite, and increased in the case of the caustic soda. Using as a "strength index" the ratio of modulus of rupture to density, the strength indexes are increased, being respectively for the control, the sulfite and the caustic soda, 1930, 2590, and 3390. The treated-fiber mat expands less on drying, against the restraining pressure used.

In considering board made from untreated fiber and fiber treated with either a sulfite or caustic soda, there are various factors to be considered. To improve the strength, there is a lower fiber yield, the yield being lower as the strength goes up. Color is also a factor. Caustic soda makes the board darker, while sulfite makes it lighter. Accordingly, where color is a prime factor, the fiber may be treated in formation with a sulfite and a stronger, lighter-colored board will result.

PAPER

Aspen fibers untreated and treated with a usage of 5% NaOH, as well as treated with slightly more than 5% usage of $Na_2SO_3$, according to the present invention have been compared in their paper making use showing that the treatment greatly improves the fiber for making paper.

Fiber prepared in the Asplund machine according to the conditions of operation above given, were screened moist as delivered by the machine, to remove the coarser particles, by use of a 12 mesh screen. The fines were washed in cold water, ball-milled at 7.5% consistency, and formed to paper sheets on a screen, and dried directly from formation, without pressing and without restraint.

The following data concerns the three samples referred to:

Sample S-226

|  | Untreated 463 | NaOH Treated 464 | $Na_2SO_3$ Treated 465 |
|---|---|---|---|
| pH: |  |  |  |
| Before washing | 5.25 | 7.10 | 6.05 |
| After washing |  | 6.50 | 6.60 |
| After ball-milling | 5.86 | 5.90 | 6.35 |
| Minutes to attain slowness of 300 seconds | 255 | 170 | 210 |
| Coarseness Modulus: |  |  |  |
| Before ball-milling | 135 | 108 | 125 |
| After ball-milling | 29 | 55 | 57 |
| Per cent reduction in CM by ball-milling | 78 | 49 | 55 |
| Paper: |  |  |  |
| Thickness in inches | .017 | .014 | .016 |
| Weight in lbs./sq. ft. | 12.13 | 12.58 | 11.56 |
| Weight in lbs./ream (480 sheet, 24 x 36 in.) | 34.92 | 36.22 | 33.31 |
| Apparent Density (lbs. ream weight/point) | 2.06 | 2.59 | 2.08 |
| Tear (16 sheets), gms., Elmendorf | 12 | 36 | 24 |
| Mullen burst | less than 2 | 3.0 | less than 2 |
| Mullen factor |  | .08 |  |

From the foregoing, it will be appreciated that the treatment with sulfite salt shortens the time for hydration, and reduces the breakage of fiber in hydration. The utility of the stock for forming paper is increased, and the paper is somewhat improved over paper from the untreated fiber.

The invention is not limited to the use of amounts of sulfite salt sufficient to prepare a neutral or nearly neutral fiber, as above described. Smaller amounts may be used for the purpose of making less drastic changes in the fiber. Also, other materials may be used with the sulfite salt. Fiber prepared with smaller amounts of chemical agents is more suitable for uses without washing the fiber, as by directly drying the fiber discharged from the defibering machine. The following example illustrates.

EXAMPLE 2

To jack pine chips to be defibered, is added a solution containing sodium sulfite and a small amount of mixed carbonates of sodium, in the amount per cu. ft. of solution of about 18.4 pounds of $Na_2SO_3$ and 0.5 pound of mixed carbonates calculated all as $Na_2CO_3$. To 100 pounds of dry wood is introduced 1.15 pounds of $Na_2SO_3$ and .031 pound of $Na_2CO_3$ equivalents of the mixed carbonates. The water introduced is not sufficient to suspend the wood or the fiber, nor to destroy the steam environment. The defibrator is operated at 150 pounds, steam pressure, and the discharged fiber dried for comparing its properties with a control fiber, similarly made, but without chemical liquor. The effect of the chemical is to increase qualities of resilience and compressibility of the fiber.

Sizing agents may be applied simultaneously with employing chemical treatment. Thus, wax in the amount of 2 parts per 100 parts of dry wood, may be used with the sodium sulfite liquor above described.

EXAMPLE 3.—BORAX AND NaHSO₃

Borax has been used with sodium bisulfite in the amount of 10% usage of borax and 5.4% usage of sodium bisulfite, based on dry wood. This was part of a series wherein borax and other chemicals were used. The presence of the bisulfite causes a much lighter-colored product to be obtained, while both chemicals contribute to neutralizing acid. The following table shows comparative properties in the series, jack pine being the wood employed.

the softer chips are defibered by pressure from heavy rolls. Chemicals at this stage are effective

Sample S-230

|  | 141 | 142 | 143 | 144 | 145 |
|---|---|---|---|---|---|
| Chemical used | None | Borax | Borax | Borax | Borax. |
| Usage |  | 10% | 6% | 10% | 10%. |
| Chemical used |  |  | Boric acid | $NaHSO_3$ | $H_2O_2$ (100%). |
| Usage |  |  | 4% | 5.4% | 3.34%. |
| Chemical used |  |  |  |  | $Na_2SiO_3$. |
| Usage |  |  |  |  | 5.76%. |
| pH moist fiber | 5.11 | 7.34 | 7.51 | 7.65 | 5.62. |
| pH dried fiber | 3.9 | 6.9 | 7.15 | 7.02 | 7.19. |
| Friability | 0.0102 | 0.0205 | 0.0359 | 0.0078 | 0.0411. |
| Fire Resistance (grams loss per min. burning rate) | 2.79 | 1.96 | 2.22 | 1.83 | 2.16. |
| Color (total reflectance), per cent | 34 | 26 | 30 | 40 | 27. |

BULK FIBER

Bulk fiber is a term used to designate fiber useful in loose or bulk form as distinguished from felted or suspended form. In particular it is useful to build up mats with fibers united or not united by adhesive. Some adhesives impart rigidity, and this is additive in the mat to the rigidity of the fibers per se. Where it is desired to use such rigidity-producing adhesives, such as some forms of protein, and where a less rigid mat is desired, softer or less rigid fibers may be obtained by the present invention, which incidentally are also light in color.

This is indicated by change in compressive properties as sodium monosulfite usage is increased. Aspen wood chips having 20.3% lignin content were used. With none, and with various usages of $NaHSO_3$, the chips have been defibered in the Asplund machine and the fiber dried and tested with results shown in the following table. A chemical analysis of the fibers is also given. The sodium monosulfite was used as a recovered chemical from a monosulfite paper-making process, in concentrated form in which every 100 parts of $NaHSO_3$ is accompanied by mixed carbonates of sodium in the amount of 2.6 parts calculated all as $Na_2CO_3$. Only the usage of $NaHSO_3$ is given in the following table.

Sample S-266

|  | 51 | 52 | 53 | 54 |
|---|---|---|---|---|
| Usage of $NaHSO_3$, per cent | 0 | 3 | 5 | 10 |
| Free-footage (FF) | 8.03 | 6.68 | 6.78 | 6.48 |
| Specific Elasticity ($K_E$) | 103 | 81 | 76 | 76 |
| Absolute Elasticity ($M_E$) | 0.41 | 0.54 | 0.52 | 0.56 |
| Specific Felting ($K_F$) | 24.7 | 17.5 | 17.4 | 19.5 |
| Absolute Felting ($M_F$) | 0.27 | 0.35 | 0.25 | 0.39 |
| Dust Content, per cent | 4.3 | 3.7 | 5.0 | 6.0 |
| Acidity, as pH | 5.0 | 6.2 | 5.1 | 6.0 |
| Coarseness Modulus (C. M.) | 136 | 96 | 99 | 98 |
| Fiber yielded by water extraction, as per cent of dry Asplund fiber | 89.3 | 82.5 | 80.4 | 80.4 |
| Lignin, in the fiber as per cent of dry Asplund fiber | 16.7 | 15.5 | 14.3 | 14.5 |
| Composition of Water Extract on basis of dry Asplund fiber: |  |  |  |  |
| Per cent Lignin | 3.6 | 4.8 | 6.0 | 5.8 |
| Per cent Carbohydrates | 7.1 | 12.7 | 13.6 | 13.8 |

The mechanical defibering may be accomplished in various machines which operate also to distribute chemicals or solutions. Machines or processes, like that of Asplund, but not operating at above 212° F. in a steam atmosphere are shown in British Patent No. 15,105, of 1911, and Schouten U. S. No. 1,367,895. The Banbury apparatus, (see Robinson U. S. No. 2,142,334 referring to Serial No. 101,014, filed September 16, 1936, now abandoned), also described in U. S. No. 1,523,387, and the Respats apparatus and process of Respess U. S. No. 1,976,297 are all useful. In the latter, wood as chips is steamed and thus softened, and according to the present invention. The rolling process takes longer than the Asplund process, and this is a compensation for its lower temperature.

It is of course to be understood that the hydration in water, and the felting from water, are merely convenient test procedures, and do not limit the invention. Hydration may be effected with moist fiber in the absence of suspending water, and felting may be done from suspension in other liquids, or gases, to form boards and papers, or other felted structures.

The invention not only contemplates the treatment of the material in defibering, but various uses thereof as expressed in the appended claims.

I claim:

1. The method of treating lignocellulose which comprises heating lignocellulose in the absence of suspending liquid and in an atmosphere of steam at an elevated temperature above 212° F. at which the lignocellulose is rendered plastic, and simultaneously defibering the plastic lignocellulose and incorporating substantially uniformly throughout the lignocellulose chemical reagent reactive therewith and containing sulfur dioxide in salt-form, whereby to produce chemically treated fibers without substantial loss of constituents of the original lignocellulose.

2. The method of producing fiber which comprises supplying undefibered lignocellulose to a mechanical defibering device, supplying a sulfite salt combining a base with sulfur dioxide to said device, mechanically defibering said lignocellulose in the absence of suspending water and in the presence of moisture in a gaseous environment by operation of said device while rubbing and pressing said lignocellulose, while distributing said sulfite salt substantially uniformly throughout the lignocellulose as the latter is being defibered and while reacting said sulfite salt with said lignocellulose thereby to effect neutralization of acidity of the lignocellulose by the base of said salt and to effect reaction between the sulfite radical of said salt and lignin content of said lignocellulose, whereby to produce a fiber of raised pH and lighter color compared to like fiber produced in like manner but without said sulfite salt, said fiber containing substantially all the solid content of the original lignocellulose.

3. The method of producing fiber which comprises supplying undefibered lignocellulose to a mechanical defibering device, supplying a sulfite salt combining a base with sulfur dioxide to said device, mechanically defibering said lignocellulose in the absence of suspending water in an atmosphere of steam at an elevated temperature above 212° F. and at which the lignocellulose softens to a plastic state, said defibering being effected by operation of said device while rubbing and pressing said plastic lignocellulose and while distributing said sulfite salt substantially uniformly throughout the lignocellulose as the latter is being defibered and while reacting said sulfite salt with said lignocellulose thereby to effect neutralization of acidity of the lignocellulose by the base of said salt and to effect reaction between the sulfite radical of said salt and lignin content of said lignocellulose, whereby to produce a fiber of raised pH and lighter color compared to like fiber produced in like manner but without said sulfite salt, said fiber containing substantially all the solid content of the original lignocellulose.

4. The method of producing fiber which comprises supplying undefibered lignocellulose to a mechanical device, supplying to said device a compound capable of releasing sulfur dioxide, mechanically defibering said lignocellulose in the absence of suspending water and in the presence of moisture in a gaseous environment by operation of said device while rubbing and pressing said lignocellulose, while distributing said compound substantially uniformly throughout said lignocellulose as the latter is being defibered, while causing sulfur dioxide to be released from said compound and while reacting said sulfur dioxide with lignin content of said lignocellulose, whereby to produce a fiber having a lighter color than like fiber produced in like manner but without said compound.

5. The process of claim 2 wherein the sulfite salt is normal sulfite salt.

6. The process of claim 2 wherein the sulfite salt is alkali metal salt of sulfurous acid.

7. The process of claim 2 wherein the sulfite salt is alkali metal monosulfite.

8. The process of claim 2 wherein the sulfite salt is acid sulfite salt.

9. The process of claim 2 wherein the sulfite salt is alkali metal bisulfite.

10. The method of producing fiber which comprises supplying undefibered lignocellulose to a mechanical defibering device, supplying to said device a sulfite salt combining a base with sulfur dioxide and a non-sulfite compound providing available neutralizing base in the presence of the natural acidity of lignocellulose for neutralizing at least a portion of such acidity, mechanically defibering said lignocellulose in the absence of suspending water and in the presence of moisture in a gaseous environment by operation of said device while rubbing and pressing said lignocellulose, while distributing said sulfite salt and said non-sulfite compound substantially uniformly throughout the lignocellulose as the latter is being defibered and while reacting said sulfite salt and said non-sulfite compound with said lignocellulose thereby to effect neutralization of acidity of the lignocellulose by said bases and to effect reaction between the sulfite radical of said salt and lignin content of said lignocellulose, whereby to produce a fiber of raised pH and lighter color compared to like fiber produced in like manner but without said sulfite salt and without said non-sulfite compound, said fiber containing substantially all the solid content of the original lignocellulose.

11. The process of claim 10 in which the non-sulfite compound is a carbonate salt.

12. The process of claim 10 in which the sulfite salt is alkali-metal monosulfite and the non-sulfite compound is alkali-metal carbonate.

13. The method of producing fiber which comprises supplying undefibered wood to a mechanical defibering device, supplying from 1 to 10 parts of alkali-metal monosulfite salt per 100 parts of wood to said device, mechanically defibering said wood in the absence of suspending water and in the presence of moisture in a gaseous environment by operation of said device, while rubbing and pressing said lignocellulose, while distributing said salt substantially uniformly throughout said wood as the latter is being defibered, and while reacting said salt with said wood whereby to effect neutralization of acidity of said wood and to effect reaction between the sulfite radical of said salt and lignin content of said wood, whereby to produce wood fiber having a raised pH and lighter color than like fiber produced in like manner but without said sulfite salt, said fiber having substantially all the solid content of the original wood.

14. The process of claim 13 in which about 5 parts of alkali-metal monosulfite to 100 parts of wood is employed.

15. The method of producing fiber which comprises supplying undefibered wood to a mechanical defibering device, supplying to said device a sulfite salt combining a base with sulfur dioxide, mechanically defibering said wood in the absence of suspending water in an atmosphere of steam at an elevated temperature above 212° F. and at which the wood softens to a plastic state, said defibering being effecting by operation of said device while rubbing and pressing said plastic wood and while distributing said sulfite salt substantially uniformly throughout the plastic wood as the latter is being defibered and while reacting said sulfite salt with said plastic wood to effect neutralization of acidity of the wood by the base of said salt and to effect reaction of the sulfite radical of said salt with lignin content of said wood, whereby to produce wood fiber having a raised pH and a lighter color compared to like fiber produced in a like manner but without said sulfite salt, said fiber having substantially all the solid content of the original wood.

16. The product made by the process of claim 2.
17. The product made by the process of claim 3.
18. The product made by the process of claim 4.
19. The product made by the process of claim 10.
20. The product made by the process of claim 13.
21. The product made by the proces of claim 14.
22. The product made by the process of claim 15.

HENRY E. WALTER.

REFERENCES CITED

The following references are of record in the file of this patent:

UNITED STATES PATENTS

| Number | Name | Date |
| --- | --- | --- |
| 106,710 | Meech | Aug. 23, 1870 |
| 1,654,624 | Wells | Jan. 3, 1928 |
| 1,785,544 | Ellis | Dec. 16, 1930 |
| 1,794,174 | Hatch | Feb. 24, 1931 |
| 1,795,603 | Hussey | Mar. 10, 1931 |
| 1,872,996 | Mason | Aug. 23, 1932 |
| 1,913,607 | McMillan | June 13, 1933 |
| 1,982,130 | Wollenberg | Nov. 27, 1934 |
| 2,008,892 | Asplund | July 23, 1935 |
| 2,047,170 | Asplund | July 14, 1936 |
| 2,072,686 | Robinson | Mar. 2, 1937 |
| 2,080,078 | Mason | May 11, 1937 |

(Other references on following page)

UNITED STATES PATENTS

| Number | Name | Date |
|---|---|---|
| 2,145,851 | Asplund | Feb. 7, 1939 |
| 2,164,040 | Offermanns | June 27, 1939 |
| 2,228,349 | Feldman | Jan. 14, 1941 |
| 2,234,188 | Morgan | Mar. 11, 1941 |
| 2,265,622 | Basler | Dec. 9, 1941 |
| 2,315,372 | Kressman | Mar. 30, 1943 |

FOREIGN PATENTS

| Number | Country | Date |
|---|---|---|
| 12,149 | Australia | Apr. 10, 1933 |
| 103,709 | Australia | Apr. 28, 1938 |
| 35,854 | Germany | June 10, 1886 |
| 393,159 | Great Britain | June 1, 1933 |

OTHER REFERENCES

Paper Trade Journal, Oct. 15, 1925, pp. 57–59.

Der Papier-Fabrikant, g. 36, 1938, Teil I, pp. 519–531.

Verein de Zellstoff und Papier-Chemiker und Ingenieure, g. 17, pp. 313–319 (1936).

A Dictionary of Paper and Paper Making Terms, by Labarre (1937), published by N. V. Swets and Zeitlinger, Amsterdam, Holland, p. 169.